on 1 day.

(12) United States Patent
Viola et al.

(10) Patent No.: US 6,758,105 B2
(45) Date of Patent: Jul. 6, 2004

(54) MAGNETOELASTIC TORQUE SENSOR ASSEMBLY

(75) Inventors: Jeffrey Louis Viola, Berkley, MI (US); John Francis Laidlaw, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 1 day.

(21) Appl. No.: 10/302,194

(22) Filed: Nov. 22, 2002

(65) Prior Publication Data

US 2004/0099064 A1 May 27, 2004

(51) Int. Cl.$^7$ .............................. G01L 3/00; G01L 3/02; G01L 3/10
(52) U.S. Cl. .............................. 73/862.08; 73/862.325; 73/862.331
(58) Field of Search ........................ 73/862.08, 865.325, 73/862.335, 862.331

(56) References Cited

U.S. PATENT DOCUMENTS

| 4,135,391 A | 1/1979 | Dahle |
| 4,566,338 A | 1/1986 | Fleming et al. |
| 4,589,290 A | 5/1986 | Sugiyama et al. |
| 4,646,576 A | 3/1987 | Kita |
| 4,976,160 A | 12/1990 | Dobler et al. |
| 5,440,938 A | 8/1995 | Leon et al. |
| 5,508,611 A | * 4/1996 | Schroeder et al. .......... 324/252 |
| 5,850,045 A | 12/1998 | Harada et al. |
| 6,330,833 B1 | 12/2001 | Opie et al. |
| 6,367,337 B1 | 4/2002 | Schlabach |
| 6,439,058 B1 | * 8/2002 | Aratani et al. ............... 73/756 |
| 6,498,481 B2 | * 12/2002 | Apel ......................... 73/118.2 |
| 2002/0112549 A1 | 8/2002 | Cheshmehdoost et al. |

* cited by examiner

Primary Examiner—Edward Lefkowitz
Assistant Examiner—Lilybett Martir
(74) Attorney, Agent, or Firm—Brinks Hofer Gilson & Lione

(57) ABSTRACT

A magnetoelastic torque sensor assembly is provided for sensing torsion load of a shaft, such as an automotive steering column. The assembly includes a molded plastic body that defines an axial channel and includes an axial opening. The assembly also includes a U-shaped lead frame that is embedded within the molded plastic body and includes side portions that extend within side sections of the molded plastic body about the channel. Magnetic flux sensors are embedded in the side sections of the molded plastic body and connected to the lead frame. For use, the shaft is radially received through the axial opening in the molded plastic body and coaxially positioned within the channel. The magnetic flux sensors are positioned about the shaft in a predetermined and fixed arrangement. The sensor array preferably includes sensors that are disposed in a plane through the axis, either diametrically opposed or axially spaced.

7 Claims, 2 Drawing Sheets

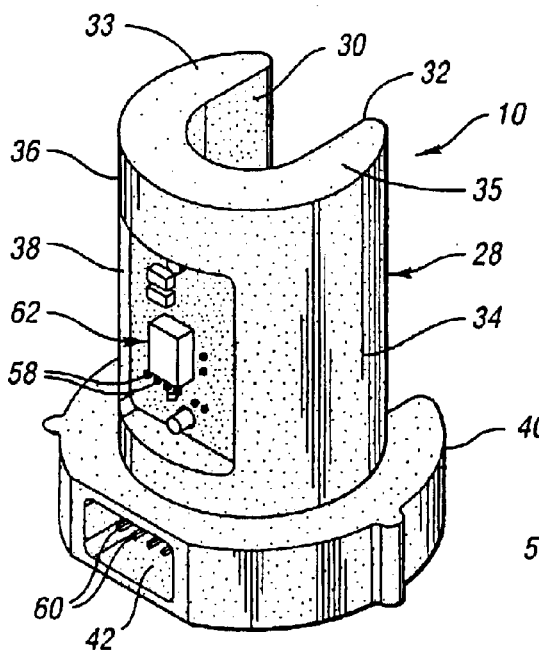
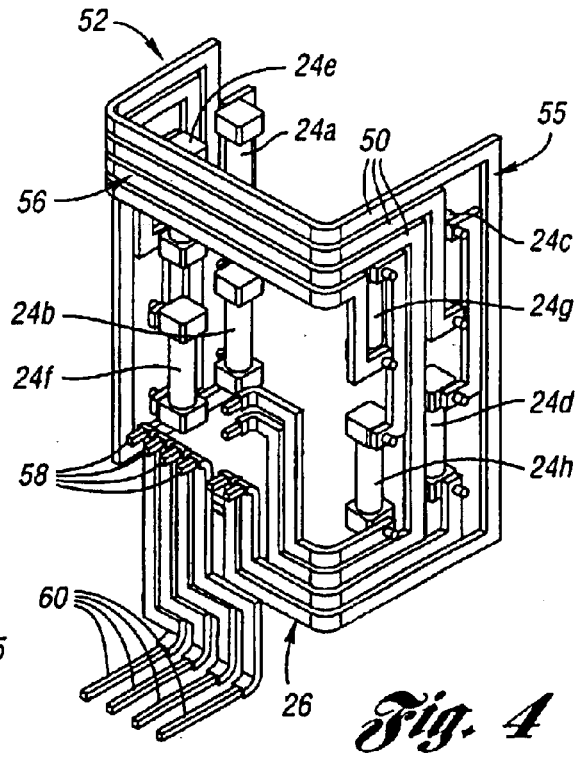
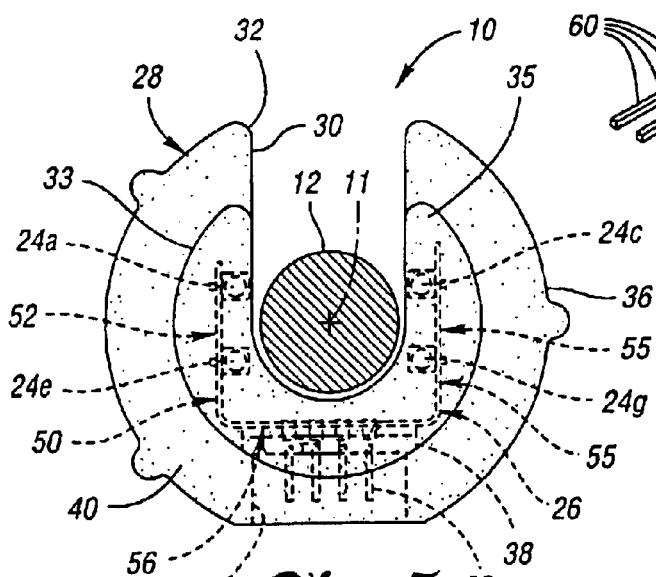

MAGNETOELASTIC TORQUE SENSOR ASSEMBLY

TECHNICAL FIELD OF THE INVENTION

This invention relates to a magnetoelastic torque sensor assembly for measuring a torsion load applied to a shaft, such as an automotive steering column or the like. More particularly, this invention relates to such magnetoelastic torque sensor assembly comprising a molded plastic body defining a channel for receiving the shaft and magnetic sensors connected to a lead frame and embedded within the molded plastic body in a predetermined arrangement relative to the shaft.

BACKGROUND OF THE INVENTION

It is known to measure variations in a torsion load applied to a shaft using a magnetoelastic effect. The shaft is provided with a magnetic circumferential band. A magnetic flux sensor is positioned adjacent to the magnetic band and detects variations in the magnetic flux about the shaft when a torsion load is applied. Typically, multiple sensors are spaced circumferentially about the shaft to enhance sensitivity. Also, in order to distinguish variations in the magnetic flux due to lateral displacement of the shaft, it is desirable to arrange sensors in diametrically opposed pairs.

One proposed application of a magnetoelastic torque sensor is to measure torsion load applied to an automotive steering column on an automotive vehicle and to utilize the measurements during turning for adjusting an electronic power assist steering system. Careful arrangement of the sensors about the shaft is required for reliable sensing. Manual positioning of sensors is time consuming and not suited for mass production. It has been proposed to mount the sensors on a clamshell or other hinged bracket. However, sensor responsiveness is subject to variations in the closure of the bracket as well as in positioning of the bracket about the shaft. Fixed arrays have been proposed but cover only a portion of the shaft circumference, and do not position the sensors in diametrically opposed relationship.

Therefore, a need exists for a magnetoelastic torque sensor assembly that may be readily installed about a shaft, such as a steering column, to position an array of sensors in a fixed arrangement relative to the shaft and also to each other, including sensors that are diametrically opposed.

BRIEF SUMMARY OF THE INVENTION

In accordance with this invention, a magnetoelastic torque sensor assembly is provided for sensing torsion load applied to a shaft. The assembly comprises a molded plastic body that defines a channel having an axis and an elongated axial opening for radially receiving the shaft to coaxially position the shaft within the channel. The molded plastic body includes a first side section and a second side section in spaced relationship about the axis. A U-shaped lead frame is embedded within the integrally molded plastic body. The lead frame includes a middle portion, a first side portion extending from the middle portion within the first side section of the molded plastic body, and a second side portion extending from the middle portion within the second side section of the molded plastic body. The middle portion includes electrical terminals adapted for external electrical connections to the channel lead frame. The magnetoelastic torque sensor also includes at least a first and a second magnetic flux sensor attached to the lead frame, with the first sensor embedded in the first section and the second sensor embedded in the second side section. Preferably, the first and second sensors are arranged in a plane parallel to the axis, either diametrically opposed or axially spaced. The magnetoelastic torque sensor is readily manufactured using the lead frame to position the magnetic flux sensors in the desired arrangement during molding and to provide electrical connections to the sensors once embedded. For use, the molded plastic body provides a robust assembly that may be readily installed about the shaft, while fixing the position of the magnetic flux sensors not only with each other, but also relative to the shaft.

BRIEF DESCRIPTION OF THE DRAWINGS

The present invention will be further illustrated with reference to the accompanying drawings wherein:

FIG. 3 is a perspective view of the magnetoelastic sensor in FIG. 1;

FIG. 4 is a perspective view showing a channel lead frame and sensor array for the magnetoelastic torque sensor in FIG. 1; and FIG. 5 is a top plan view of the magnetoelastic sensor in FIG. 1.

DETAILED DESCRIPTION OF THE INVENTION

Figure 1:
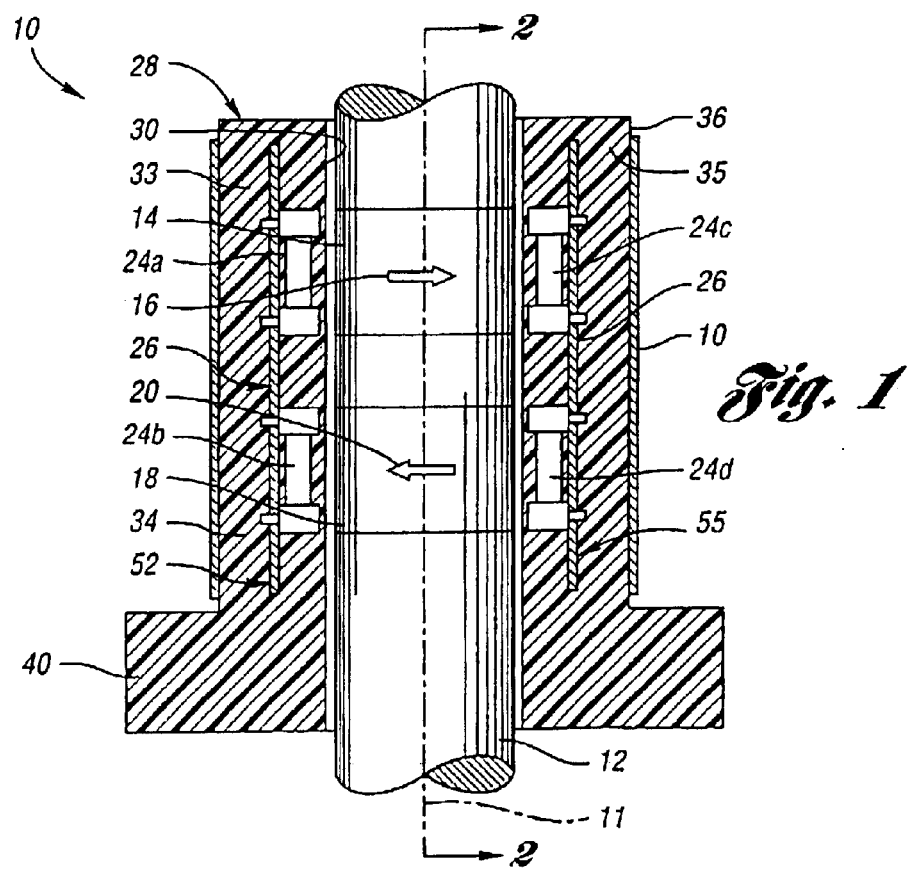
FIG. 1 is a cross-sectional view of a magnetoelastic torque sensor in accordance with a preferred embodiment of this invention.
Figure 2:
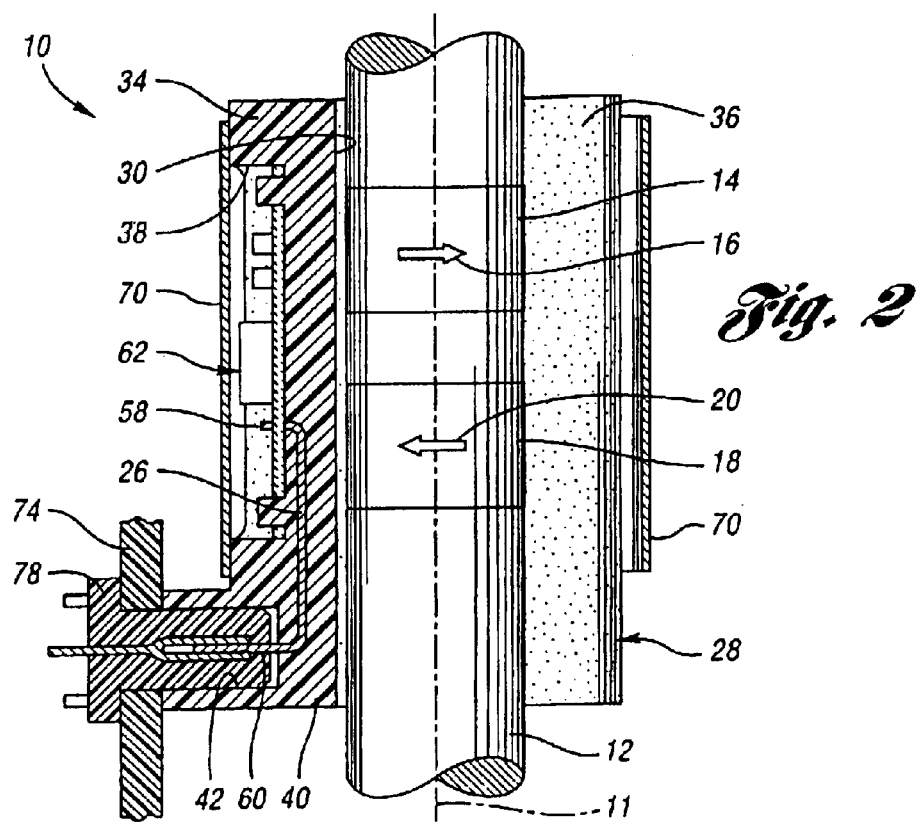
FIG. 2 is a cross-sectional view of the magnetoelastic torque sensor in FIG. 1 taken along lines 2—2 in the direction of the arrows.

In accordance with the preferred embodiment of this invention, referring to the Figures, a magnetoelastic torque sensor assembly 10 is adapted for measuring torsion load applied to a shaft 12 of an automotive steering assembly. By way of this example, shaft 12 comprises a pinion gear (not shown) of a rack and pinion steering system and includes spaced bearing journals (not shown). Assembly 10 is designed to be installed about the shaft between the bearing journals. Shaft 12 is rotatable about a central longitudinal axis 11. For purposes of sensing torsion loading, shaft 12 is provided with a first magnetic band 14 having a magnetic field in a direction 16 and a second magnetic band 18 having a magnetic field in an opposite direction 20. During steering of the vehicle, rotation of shaft 12 about a central longitudinal axis 11 causes variations in the magnetic fields within bands 14 and 18 that are detectable and provide a measure of torsion loading on the shaft. In this embodiment, the torque measurements made by sensor 10 provides input to an electronic power assisted steering system of the vehicle.

Magnetoelastic torque sensor 10 comprises, as major elements, an array of two or more magnetic flux sensors 24a–h affixed to a channel lead frame 26 and embedded in an integrally molded plastic body 28.

Molded plastic body 28 is composed of a polymeric material having nonmagnetic properties and has a U-shape to define a channel 30 sized and shaped for receiving shaft 12. Channel 30 is elongated along an axis 11 that corresponds to the shaft axis when the shaft is installed. Channel 30 includes an axial opening 32 to allow body 28 to be laterally positioned about the shaft between a first side section 33 and a second side section 35 of body 28. Body 28 includes a main portion 34 wherein sensing elements 24 are embedded. Portion 34 has a generally cylindrical outer surface 36 and includes a recess 38 for receiving a microelectronic module as described hereinafter. Body 28 also includes an enlarged end portion 40 that defines a recess 42 for receiving an electrical connector for coupling to an external electrical circuit.

Sensors 24 are embedded within body 28 proximate to channel 30. Suitable sensors are electrical inductors comprising a wire coil about a soft magnetic cylindrical core and are positioned such that the cylindrical axis is parallel to axis 11. In this embodiment, the array comprises four sensors 24a, 24c, 24e, 24g arranged for detecting magnetic flux about first magnetic band 14 and four sensors 24b, 24d, 24f, 24h for detecting flux about second magnetic band 18. Two first band sensors 24a, 24e and two second band sensors 24b, 24f are embedded within a first channel side 33, whereas the remaining two first band sensors 24c, 24g and two second band sensors 24d, 24h are embedded within a second channel side. Of particular significance to the preferred arrangement, the array includes sensor positioned in a plane through the axis. In this example, sensors 24a, b, g and h lie in a plane through the axis, whereas sensors 24c, d, e, and f lie in a second plane through the axis. Each plane includes sensors that are diametrically opposite, for example, 24a and 24g, and sensors that are axially spaced, for example, sensors 24a and 24h.In this manner, signals from opposite sensors may be readily processed to distinguish variations in magnetic flux due to lateral displacement of the shaft and thereby provide a more reliable measure of the signals resulting from torsion loading of the shaft. While this embodiment has been disclosed in terms of a preferred embodiment comprising an array of eight sensors that provide redundant measurements about multiple shaft magnetic fields to enhance sensitivity and reliability, measurements may be suitably obtained using a maximum of two sensors in an axial diametric relationship, either directly opposed or axially displaced.

Sensors 24 are affixed to a U-shaped lead frame 26 that is also embedded within molded plastic body 28. Referring particularly to FIG. 4, lead frame 26 includes a series of discrete traces 50 that provide electrical connection to the sensors. Lead frame 26 is formed of a copper plated metal sheet that is stamped to define the traces 50 and bent to form a first side portion 52 disposed within first channel side 33 of molded plastic body 28, a second side portion 55 that is embedded within second channel side 35 of molded plastic body 28, and middle section 56 therebetween. Within each section, traces 50 are generally planar. Lead frame 26 further comprises a first series of terminals 58 that extend within recess 38 and a second series of terminals 60 that extend within recess 42 of enlarged end portion 40 to allow external electrical connections.

In accordance with this embodiment, assembly 10 comprises a microelectronic module 62 for processing electrical signals from the sensors 24. Module 62 is received in recess 38 and connected to lead frame 26 by terminals 58. Thus, electrical signals from the sensing elements 24 are conducted through lead frame 26 to module 62 for processing. Module 62 is also connected through terminals 58 to terminals 60 for making external electrical connections.

A main advantage of magnetoelastic torque sensor 10 is that it may be readily manufactured using common manufacturing processes. A copper plated metal sheet is stamped to define traces 50. Sensors 24 are soldered to the traces, and the lead frame is bent to form first side portion 52 and second side portion 55, as well as terminals 58 and 60. At this stage, traces 50 are interconnected by tabs that join terminals 58 and 60, which tabs maintain the discrete traces in the desired arrangement during handling and plastic molding operations, and are thereafter removed to isolate the traces. With the tabs attached, lead frame 26 is arranged within a cavity of a plastic mold having a shape corresponding to plastic body 28. Plastic is injected into the mold to form body 28 and to embed sensing elements 24 and lead frame 26 within the plastic body. Thereafter, the tabs connected to terminals 58 and 60 are removed to separate the traces.

Another major advantage of the magnetoelastic torque sensor assembly 10 is that it may be readily installed about shaft 12 during manufacturing of the automatic steering system. Following installation of shaft 12 onto an automotive chassis, sensor 10 is installed about the shaft through axial opening 32 so that shaft 12 is coaxially located in channel 30. A metallic shield 70 is axially slid along shaft 12 and positioned about surface 36 of plastic body 28. Shield 70 surrounds sensing elements 24 to protect the sensing elements from external magnetic fields. A housing 74 is then mounted about shaft 12. Housing 74 includes an opening that aligns with recess 42 in the enlarged end portion 40. An electrical connector 78 is inserted through the opening to connect terminals 60 to a wiring harness for communicating with the electrical control system of the automotive vehicle. In addition, connector 78 secures the magnetoelastic torque sensor to prevent rotational and axial displacement thereof, eliminating the need for additional fasteners.

Therefore, this invention provides a robust magnetoelastic torque sensor assembly wherein an array of sensors are embedded in a plastic body in a predetermined and fixed relationship to prevent variations in position during use. The crescent shape of the plastic body permits the torque sensor to be readily installed about the shaft with the sensors disposed about the shaft axis in the desired relationship. The sensor assembly is readily manufactured using a lead frame to accurately position the sensing elements during plastic molding operations and to assure reliable electrical connections to the sensors during operation. It is an advantage of the preferred embodiment that a microelectronic module is assembled onto the plastic body for processing the electrical signals from the sensors. This permits the entire assembly (including module 62) to be arranged within a metal shield and protect from external electromagnetic fields.

While this invention has been described in terms of certain embodiments thereof, it is not intended to be limited to the described embodiments, but only to the extent set forth in the claims that follow.

What is claimed is:

1. A magnetoelastic torque sensor assembly for sensing torsion loading of a shaft, said magnetoelastic torque sensor assembly comprising:

a molded plastic body defining a channel having an axis and an elongated axial opening for radially receiving said shaft, said molded plastic body comprising a first side section and a second side section in opposite spaced relationship about said channel;

a lead frame embedded within the integrally molded plastic body and comprising a middle portion, a first side portion extending from said middle portion within the first side section of the molded plastic body, and a second side portion extending from said middle portion within the second section of the molded plastic body, said middle portion comprising electrical terminals adapted for external electrical connection;

a first magnetic flux sensor embedded in said first side section proximate said channel and operatively connected to said lead frame; and a second magnetic flux sensor embedded in said second side section adjacent said channel and operatively connected to said lead frame.

2. A magnetoelastic torque sensor assembly in accordance with claim 1 wherein said first magnetic flux sensor and said second magnetic flux sensor are disposed in a plane comprising the axis.

3. A magnetoelastic torque sensor assembly in accordance with claim 2 wherein said first magnetic flux sensor and said second magnetic flux sensor are diametrically opposed relative to the axis.

4. A magnetoelastic torque sensor assembly in accordance with claim 1 further comprising a microelectronic module affixed to said integrally molded plastic body adjacent said middle portion and operatively connected to said electrical terminals.

5. A magnetoelastic torque sensor assembly in accordance with claim 1 further comprising a metallic shield encircling said molded plastic body about said first and second magnetic flux sensors.

6. A magnetoelastic torque sensor assembly in accordance with claim 2 wherein said first magnetic flux sensor and said second magnetic flux sensor are axially offset.

7. A magnetoelastic torque sensor assembly for sensing torsion loading of a shaft, said magnetoelastic torque sensor assembly comprising:

a molded plastic body defining a channel having an axis and an elongated axial opening for radially receiving said shaft, said molded plastic body comprising a first side section and a second side section in opposite spaced relationship about said axis;

a U-shaped lead frame embedded within the integrally molded plastic body and comprising a middle portion, a first side portion extending from said middle portion within the first side section of the molded plastic body, and a second side portion extending from said middle portion within the second side section of the molded plastic body, said middle portion comprising electrical terminals adapted for external electrical connection;

a first series of magnetic flux sensors embedded in said first side section adjacent said channel and operatively connected to said first side portion of the U-shaped lead frame;

a second series of magnetic flux sensors embedded in said second side section adjacent said channel and operatively connected to said second side portion of the channel lead frame; and a microelectronic module affixed to said integrally molded plastic body adjacent said middle portion and operatively connected to said electrical terminals.

* * * * *